(12) United States Patent
Timme et al.

(10) Patent No.: US 8,152,238 B2
(45) Date of Patent: Apr. 10, 2012

(54) WASHABLE CHILD CAR SEAT SUBFRAME

(75) Inventors: Ruth G. Timme, Avon, CT (US); Michael Goldberg, Glastonbury, CT (US)

(73) Assignee: Ruth E. Timme, Avon, CT (US)

( * ) Notice: Subject to any disclaimer, the term of this patent is extended or adjusted under 35 U.S.C. 154(b) by 179 days.

(21) Appl. No.: 12/027,701

(22) Filed: Feb. 7, 2008

(65) Prior Publication Data
US 2009/0200842 A1 Aug. 13, 2009

(51) Int. Cl.
A47D 1/10 (2006.01)
A47C 1/08 (2006.01)
A47C 7/00 (2006.01)

(52) U.S. Cl. ........... 297/250.1; 297/440.15; 297/440.13; 297/440.1

(58) Field of Classification Search ............... 297/440.1, 297/440.13, 440.15, 440.22, 250.1
See application file for complete search history.

(56) References Cited

U.S. PATENT DOCUMENTS

| | | | |
|---|---|---|---|
| 3,054,637 A | | 9/1962 | Pambello |
| 3,658,381 A | * | 4/1972 | Grant, Sr. .................... 297/440.1 |
| 3,669,495 A | * | 6/1972 | Von Rudgisch .......... 297/451.11 |
| 4,854,638 A | * | 8/1989 | Marcus et al. ............ 297/256.11 |
| 5,265,939 A | * | 11/1993 | Self et al. .................. 297/440.13 |
| 5,360,258 A | | 11/1994 | Alivizatos |
| 5,366,271 A | | 11/1994 | Johnston et al. |
| 5,454,331 A | * | 10/1995 | Green ........................... 108/180 |
| 5,499,860 A | | 3/1996 | Smith et al. |
| 5,509,720 A | * | 4/1996 | Croom ...................... 297/440.14 |
| 5,642,917 A | | 7/1997 | Geiger |
| 5,755,489 A | * | 5/1998 | Rossman et al. .............. 297/338 |
| 5,785,383 A | | 7/1998 | Otero |
| 5,803,543 A | | 9/1998 | Hartmann |
| 5,803,548 A | * | 9/1998 | Battle ....................... 297/440.13 |
| 5,887,950 A | | 3/1999 | Kuo |
| 5,971,479 A | | 10/1999 | Jacquemot et al. |
| 6,017,088 A | | 1/2000 | Stephens et al. |
| 6,033,019 A | | 3/2000 | Hession-Kunz et al. |
| 6,048,028 A | | 4/2000 | Bapst |
| 6,079,781 A | | 6/2000 | Tilley |
| 6,739,649 B2 | | 5/2004 | Kelly et al. |
| 6,783,182 B1 | * | 8/2004 | Gallagher ................ 297/440.14 |
| 6,969,120 B2 | | 11/2005 | Levin |
| 7,134,728 B1 | * | 11/2006 | Buhrman ................. 297/440.14 |
| 7,229,132 B2 | | 6/2007 | Meeker et al. |
| 7,300,110 B1 | * | 11/2007 | Debien .................... 297/440.13 |
| 2003/0020307 A1 | | 1/2003 | Dunham |
| 2003/0151281 A1 | | 8/2003 | Williams |
| 2004/0061366 A1 | | 4/2004 | Meeker et al. |
| 2004/0124677 A1 | | 7/2004 | Meeker et al. |
| 2005/0151401 A1 | | 7/2005 | Evans |
| 2007/0001495 A1 | | 1/2007 | Boyle et al. |
| 2007/0236061 A1 | | 10/2007 | Meeker et al. |

* cited by examiner

Primary Examiner — David Dunn
Assistant Examiner — Tania Abraham
(74) Attorney, Agent, or Firm — DeLio & Peterson, LLC; Robert Curcio

(57) ABSTRACT

A child car seat subframe that is easily disassembled into component sections for washing within a residential-sized dishwasher. The car seat subframe can be disassembled by hand, and each individual component is cable of fitting in a residential-sized dishwasher individually and collectively. The component sections are attached by a combination of registration tabs and slots, and held tightly together by fasteners, or attached by a combination of tongue and groove joints. Hanging devices, such as hooks, may be formed on one side of each component section to facilitate hanging on racks in a dishwasher. The car seat subframe back panel and side panels are disassembled into a plurality of segments for easily fitting in a dishwasher.

19 Claims, 14 Drawing Sheets

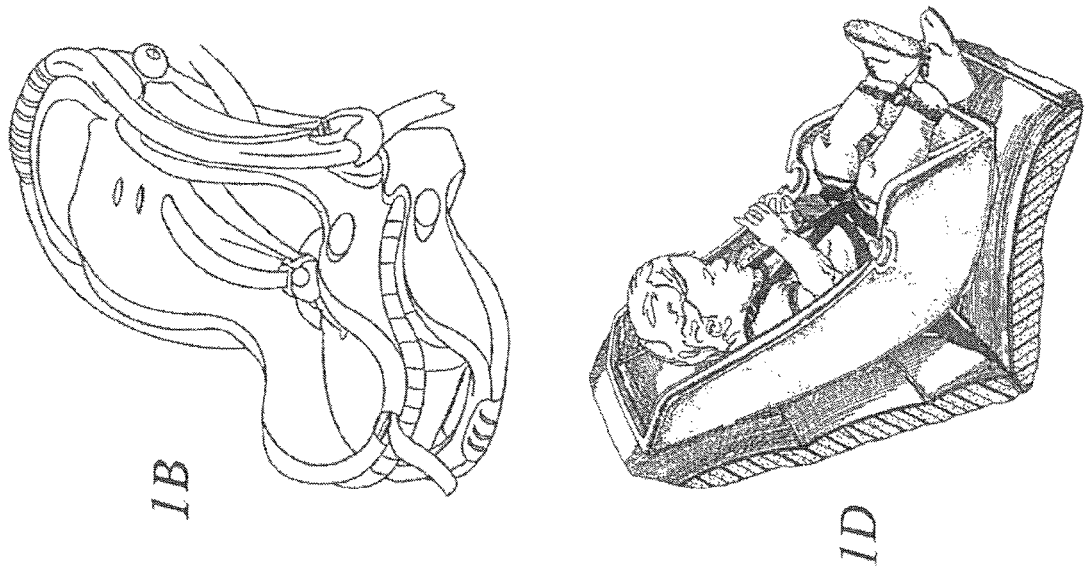
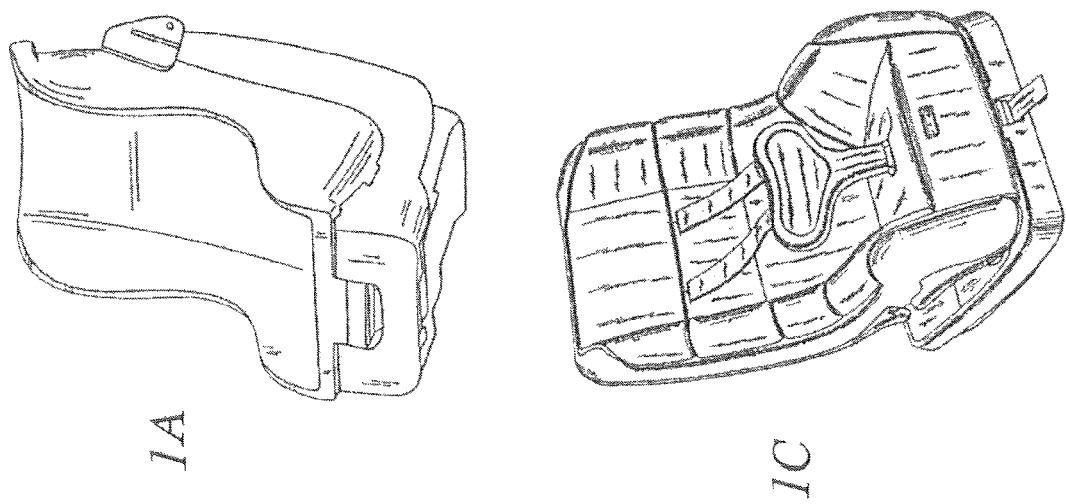
FIG. 1
(prior art)

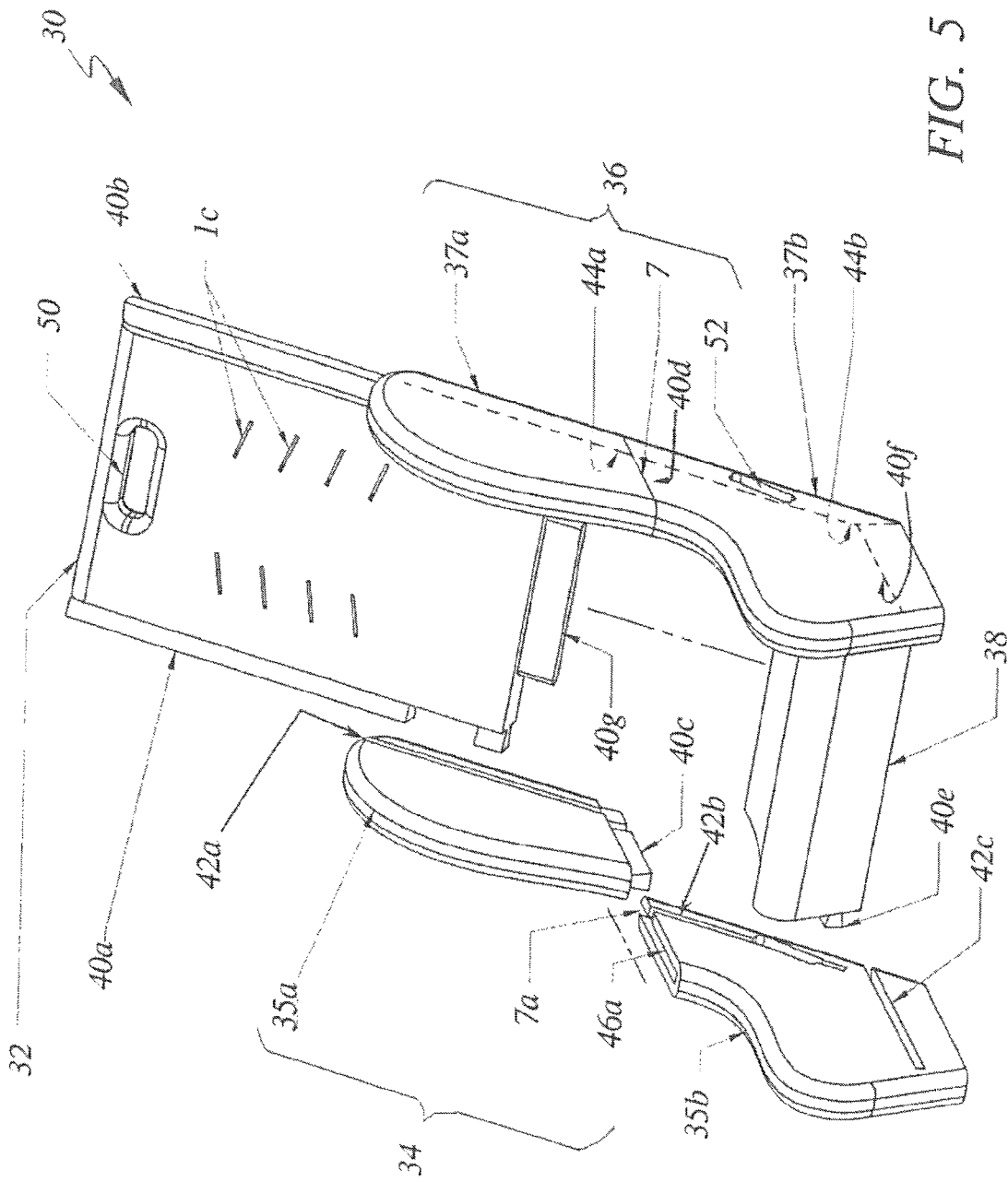

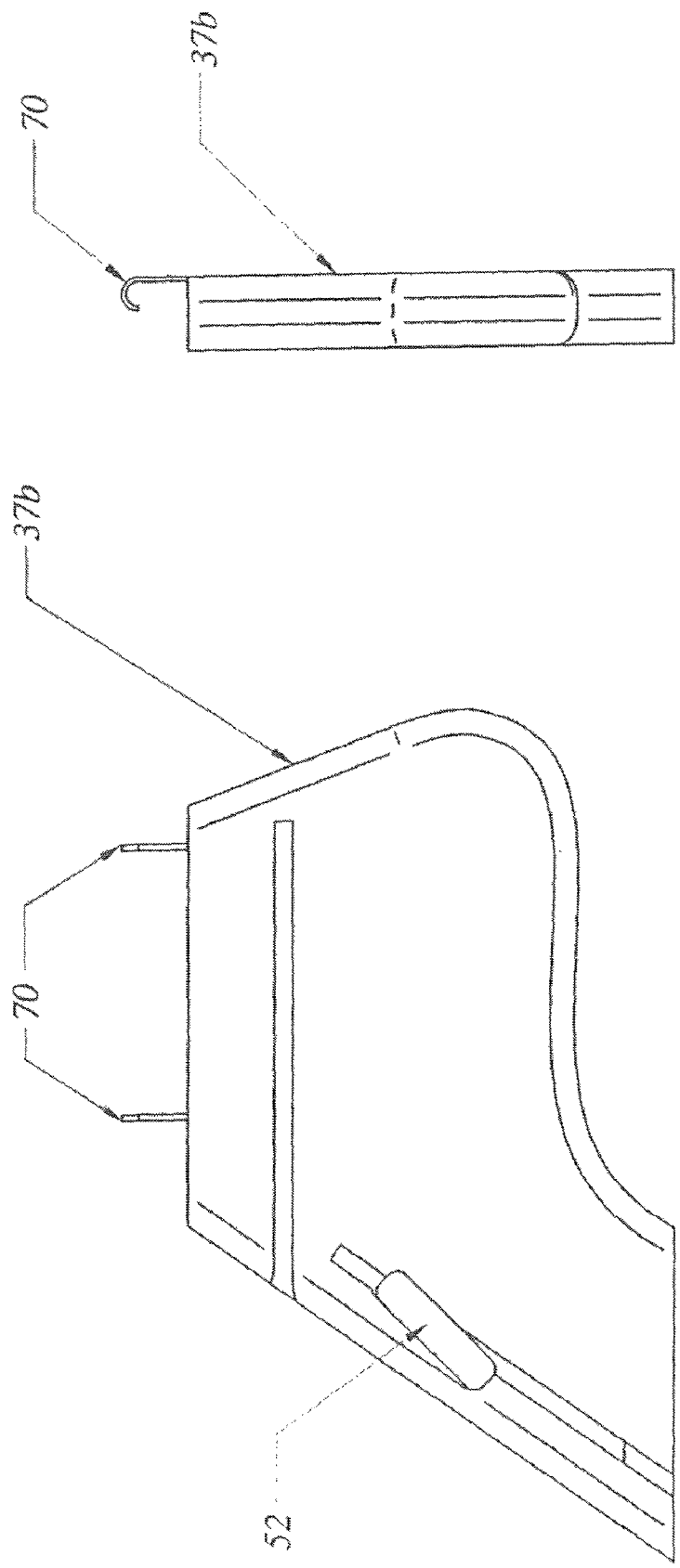

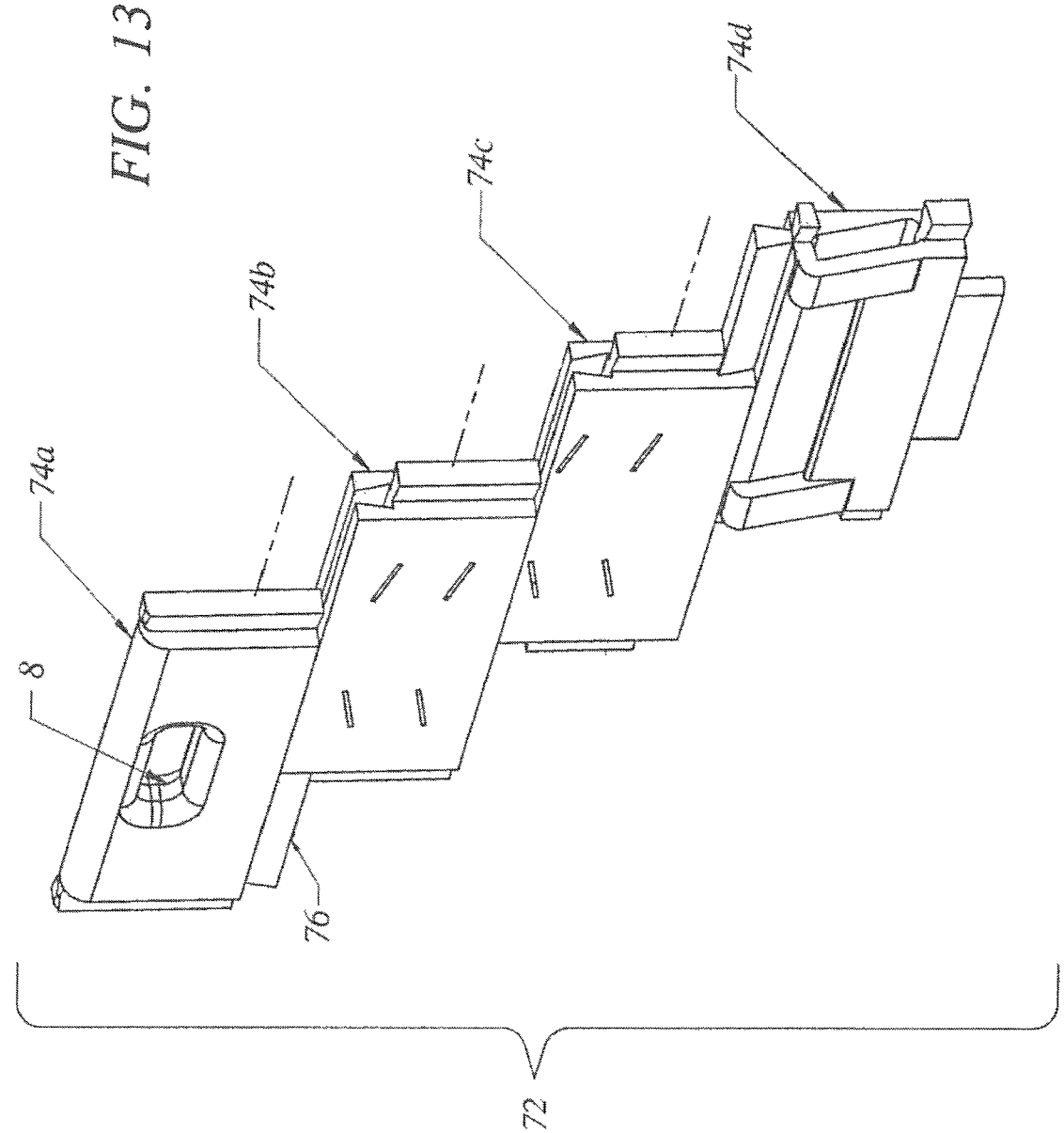

WASHABLE CHILD CAR SEAT SUBFRAME

BACKGROUND OF THE INVENTION

1. Field of the Invention

The present invention relates to a child car seat subframe that is easily disassembled into sections that will fit conveniently within a residential-sized dishwasher for repeated cleaning.

2. Description of Related Art

Conventional child car seats typically consist of a rigid plastic structural subframe over which a padded fabric cover is attached. The padded cover is typically retained in place by an elastic perimeter that wraps around the edge of the subframe, and/or small plastic or metal hooks that couple to attachment points molded into the peripheral surface edge of the subframe.

A harness for securing the child into the child seat, typically a three-point harness, passes through slots in the subframe, and is generally secured behind the subframe between the slots. Penetrations are typically provided in the cover for passing the child harness through, as well as other accessories that may be provided. On some units, a T-bar is included as part of the harness. Additionally, a crossover bar may be included as a supplemental restraint.

The subframe provides structural integrity and, on some units, provides energy absorption in the event of a vehicle collision. The subframe is typically of unitary molded construction, often with accessory subcomponents attached, such as crossover bars, T-bars, cup holders, and the like. Slots or channels are molded into the subframe to provide a path for the vehicle seat belt, which is used to secure the unit in place in the vehicle seat.

Generally, the molded structure of the subframe is populated with ribs, depressions, penetrations, and other topographical features that serve various purposes, such as providing rigidity, strength, and weight reduction, forming a vehicle seat belt path, and providing attachment points for the child harness, cover, and other accessories.

FIGS. 1A-1D depict a variety of conventional child car seats.

Small children are indigenously messy, and child car seats invariably accumulate spills of numerous tacky fluids, such as milk or juice. In addition, dry spills, such as cereals, cookie crumbs, and the like, often combine with the liquid spills and form a mortar-like, hardened consistency that can be very difficult to remove.

The padded cover on most commercially available child car seats, such as those depicted in FIGS. 1A-1D, is easily removed and washed by hand or in a conventional washing machine. However, it is not uncommon for significant portions of the accumulated spills to pass through the padded cover, either leaching directly through the fabric, or passing through the various cover penetrations. Spills that seep through the cover often accumulate in the various topographical features of the subframe. Access to spills accumulated on the subframe is difficult at best and genuinely burdensome. Often, due to the overly burdensome nature of accessing the accumulated spills, the cleaning of the subframe is scarcely performed. Thus, subframe cleaning is generally a tedious and difficult job, and when performed, only partially effective.

There remains a need in the art for a child car seat that can be easily disassembled and reassembled, preferably without the use of hand tools, having a subframe that is composed of compact components small enough to fit collectively into a residential-sized dishwasher for thorough and repeated cleaning of all of its ubiquitous grooves, indentations, crevices, and other salient nooks and crannies.

The prior art does not teach or disclose a child car seat capable of these features. For example, in U.S. Pat. No. 7,229,132 issued to Meeker, et al., on Jun. 12, 2007, entitled "FOLDABLE BOOSTER CAR SEAT," a foldable, collapsible seat is taught that folds compactly to facilitate transportation, and reduce physical space requirements for storage at the retail level. The folding booster seat is comprised of two main molded components, the seat and back sections, joined by a main pivot. The pivot allows the back and seat sections to fold toward each other. The reduction in size due to folding is roughly half the size of a typical non-folding seat, which although minimizes retail shelf space, is too large to fit in a normal residential size dishwasher. Moreover, due to folding, the car seat sections will not have all surfaces exposed for dishwasher cleaning. The car seat is not designed for easy disassembly (or reassembly) that would allow all surfaces to be exposed during washing.

In U.S. Publication No. 2007/0236061 issued to Meeker, et al., on Oct. 11, 2007, entitled, "LOW COST ADJUSTABLE AND FOLDABLE CAR SEAT," a child car seat is taught that is foldable, has an adjustable back height, and folding armrests, to minimize warehouse and shipping space. Although it may be possible to fold this car seat in a residential dishwasher, once again, this type of design does not lend itself for such washing. In a dishwasher, the folded car seat would not have all surfaces exposed for direct washing. Furthermore, this design does not teach or disclose easy attach/detach points to facilitate disassembly or reassembly.

SUMMARY OF THE INVENTION

Bearing in mind the problems and deficiencies of the prior art, it is therefore an object of the present invention to provide a child car seat subframe with safety, comfort, and ease of use comparable to its conventional counterparts, that may be conveniently disassembled for washing in a conventional dishwasher, and easily reassembled thereafter.

It is another object of the present invention to provide a child car seat subframe that is capable of repeated disassembly and reassembly with individual components that fit collectively within a residential-sized dishwasher.

A further object of the invention is to provide a car seat subframe formed from a plurality of sections that are attached together to form a rigid structure when in use, capable of withstanding the forces associated with automobile collisions, and still able to be conveniently disassembled without the use of tools into its component sections, each of which will fit in a conventional dishwasher, and preferably all of which will fit in the dishwasher at the same time.

Still other objects and advantages of the invention will in part be obvious and will in part be apparent from the specification. The above and other objects, which will be apparent to those skilled in the art, are achieved in the present invention which is directed to, in a first aspect: a child restraint seat subframe adapted to be removably attached to a vehicle seat, and having individual components sized for cleaning in a residential-sized dishwasher upon disassembly, the child restraint seat subframe comprising: left and right side panels; a back panel having a front surface, and left and right edge surfaces, the left edge surface in contact with a portion of the left side panel, the right edge surface in contact with a portion of the right side panel; a seat having a back end, a front end, a top surface, and left and right side faces, the seat left side face in contact with a portion of the left side panel, the seat right side face in contact with a portion of the right side panel, the seat back end in contact with the back panel front surface lower end; and a plurality of fasteners connecting the side panels to either the seat portion or the back panel, or connecting the side panels to both the seat portion and the back panel; the back panel left edge surface mated to the left side panel by at least one interlocking registration tab and corresponding slot, and the back panel right edge surface mated to the right side panel by at least one interlocking registration tab and corresponding slot.

The seat back end may be mated to the back panel front surface lower end by at least one interlocking registration tab and corresponding slot. The at least one interlocking registration tab may be integrally formed with, or attached to, the back panel, the left side panel, or the right side panel.

The left and right side panels and the back panel may include keyed interlocking registration tabs and slots such that assembly can only be performed with the left panel on the child restraint seat's left side and the right panel on the child restraint seat's right side.

Hanging devices, such as hooks, may be formed with, or attached to, the left and right side panels, the back panel, or the seat, for hanging components of the subframe in the residential-sized dishwasher.

In a second aspect, the present invention is directed to a child restraint seat subframe adapted to be removably attached to a vehicle seat, the child restraint seat subframe comprising: left and right side panels, each side panel comprising at least two sections, including an upper section and a lower section, each of the at least two sections sized to fit in a residential-sized dishwasher; a back panel having a top surface, a bottom surface, a front surface, and left and right edge surfaces; and a seat sized to fit in a residential-sized dishwasher, the seat having a top surface, and left and right side faces, the seat left side face in contact with a portion of the left side panel, the seat right side face in contact with a portion of the right side panel; and wherein: the left side panel sections are slidably mated to each other; the right side panel sections are slidably mated to each other; the back panel left edge surface is slidably mated to the left side panel; the back panel right edge surface is slidably mated to the right side panel; the seat left side face is slidably mated to the left side panel; and the seat right side face is slidably mated to the right side panel.

The child restraint seat subframe may further include the left side panel upper section slidably mated to the left side panel lower section; the right side panel upper section slidably mated to the right side panel lower section; the back panel left edge surface slidably mated to the left side panel upper section; the back panel right edge surface slidably mated to the right side panel upper section; the seat left side face slidably mated to the left side panel lower section; and the seat right side face slidably mated to the right side panel lower section.

In this configuration, the seat top surface and the back panel bottom surface may mate by at least one mortise tab and slot combination.

Also, the back panel left edge surface may be slidably mated to the left side panel lower section, and the back panel right edge surface may be slidably mated to the right side panel lower section.

The back panel may comprise a plurality of panel segments, each of the panel segments having a mating bottom edge, or a mating top edge, or both, for mating to an adjacent panel segment. The plurality of back panel segments may include at least one interlocking tongue or groove joint located at each mating interface.

Hanging devices, such as hooks, may be attached to, or integrally formed with, each of the left and right side panel sections for hanging the panel sections in the residential-sized dishwasher.

Hanging devices, such as hooks, may also be attached to, or integrally formed with, the back panel, each of the plurality of panel segments, the seat, or any combination thereof, for hanging some or all of these components in the residential-sized dishwasher as well.

In a third aspect, the present invention is directed to a method of cleaning a child restraint seat subframe comprising: disassembling the child restraint seat into its component sections, including: removing left and right side panels of the child restraint seat subframe from a back panel and a seat portion by first hand loosening and removing fasteners from the left and right side panels; and disconnecting interlocking registration tabs from corresponding slots from each of the component sections; placing the left and right side panels, the back panel, and the seat, together within a residential-sized dishwasher; and washing the left and right side panels, the back panel, and the seat component, simultaneously or separately within in the dishwasher.

In a fourth aspect, the present invention is directed to a method of cleaning a child restraint seat subframe comprising: disassembling the child restraint seat into its component sections, including: slidably removing a back panel from left and right side panels and from a seat by pulling the back panel upwards relative to the side panels and the seat portion, through a tongue and groove joint connecting the back panel to the left and right side panels; slidably removing a first section of the left side panel from a second section of the left side panel by pulling the left side panel first section away from the left side panel second section in a direction parallel to a tongue and groove joint connecting both sections; slidably removing a first section of the right side panel from a second section of the right side panel by pulling the right side panel first section away from the right side panel second section in a direction parallel to a tongue and groove joint connecting both sections; slidably removing the seat from the left and right side panel by pulling the seat in a direction parallel to a tongue and groove joint connecting the left and right panels and the seat; placing the left and right side panels, the back panel, and the seat, together within a residential-sized dishwasher; and washing the left and right side panels, the back panel, and the seat, simultaneously or separately within the residential-sized dishwasher.

The method further includes separating individual back panel sections from one another by pulling each of the back panel sections in opposite directions, parallel to a tongue and groove joint connecting one back panel section to an adjacent back panel section.

The component sections are then hung onto racks in the residential-sized dishwasher by individual hanging devices, such as hooks, formed integrally with, or attached to, the component sections.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 1A-1D depict various child car seat designs of the prior art, where the subframes are made of a unitary construction.

FIG. 5 is an exploded assembly view of the second embodiment of the child car seat of the present invention.

FIG. 11A depicts a side view of an embodiment of the child car seat of the present invention with hanging devices, such as hooks, to facilitate placement in a dishwasher.

FIG. 11B depicts cross-sectional view of the embodiment of the child car seat of FIG. 11A.

FIG. 13 depicts an assembly view of a back panel of the present invention encompassing a sufficient quantity of sections that are small enough to fit edgewise in a residential-sized dishwasher.

DESCRIPTION OF THE PREFERRED EMBODIMENT(S)

In describing the preferred embodiment of the present invention, reference will be made herein to FIGS. 1-15 of the drawings in which like numerals refer to like features of the invention.

As used herein, the terminology "child car seat", "child seat", or "unit" refers to car seats for children of any age, including infants and toddlers, as well as car seats commonly referred to as hybrid booster seats or booster seats. The term "vehicle seat" is used to refer to the back or front seat of any type vehicle, including, but not limited to cars, minivans, sport utility vehicles, vans, and trucks.

Conventional child car seats, being of unitary molded construction are too large to fit in a conventional residential-sized dishwasher. To address this, in the preferred embodiments the subframe comprises a plurality of sections which are attached together to form a rigid construction when in use. This subframe may be conveniently disassembled into its component sections, which collectively fit into a dishwasher. A plurality of embodiments that fulfill the objects of the invention, comprising alternate configurations, and techniques for assembly of the sections and placement in the dishwasher are described herein.

Figure 2:
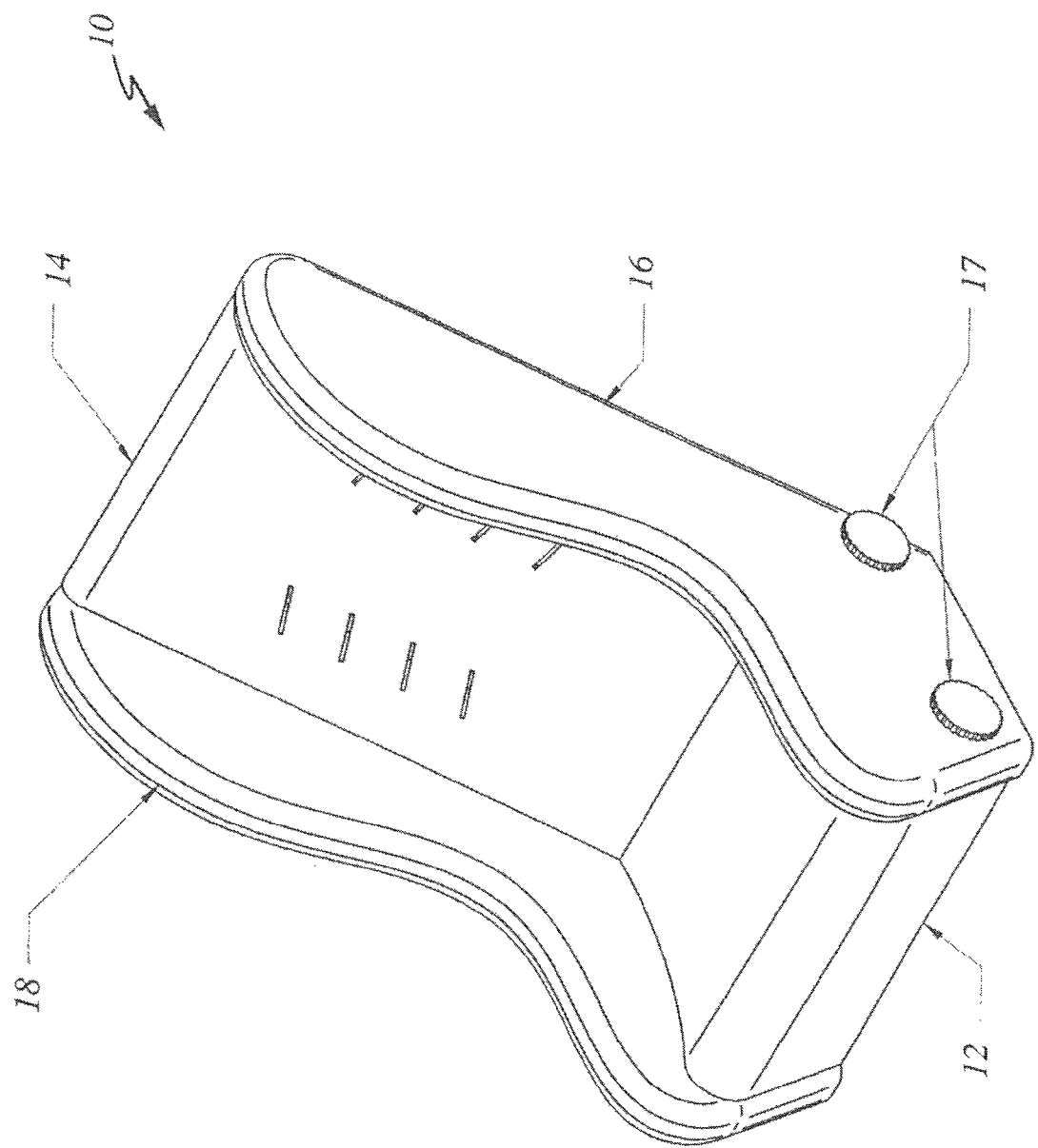
FIG. 2 is an isometric view of the first embodiment of the child car seat of the present invention.
Figure 3A:
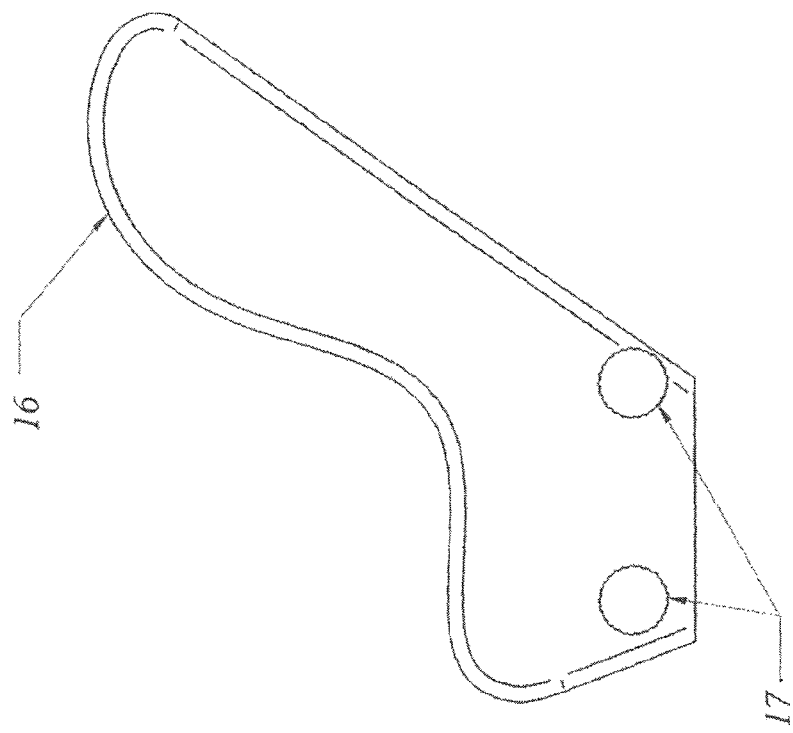
FIGS. 3A and 3B depict frontal and side views respectively of the child car seat of FIG. 2.
Figure 3B:
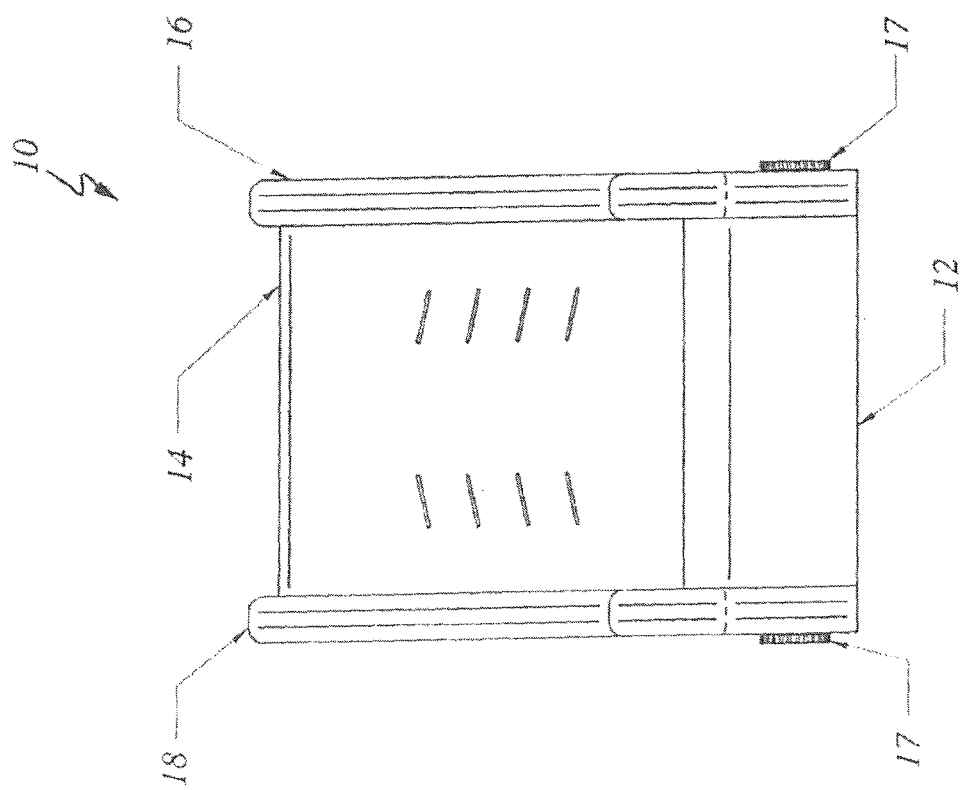
Figure 4:
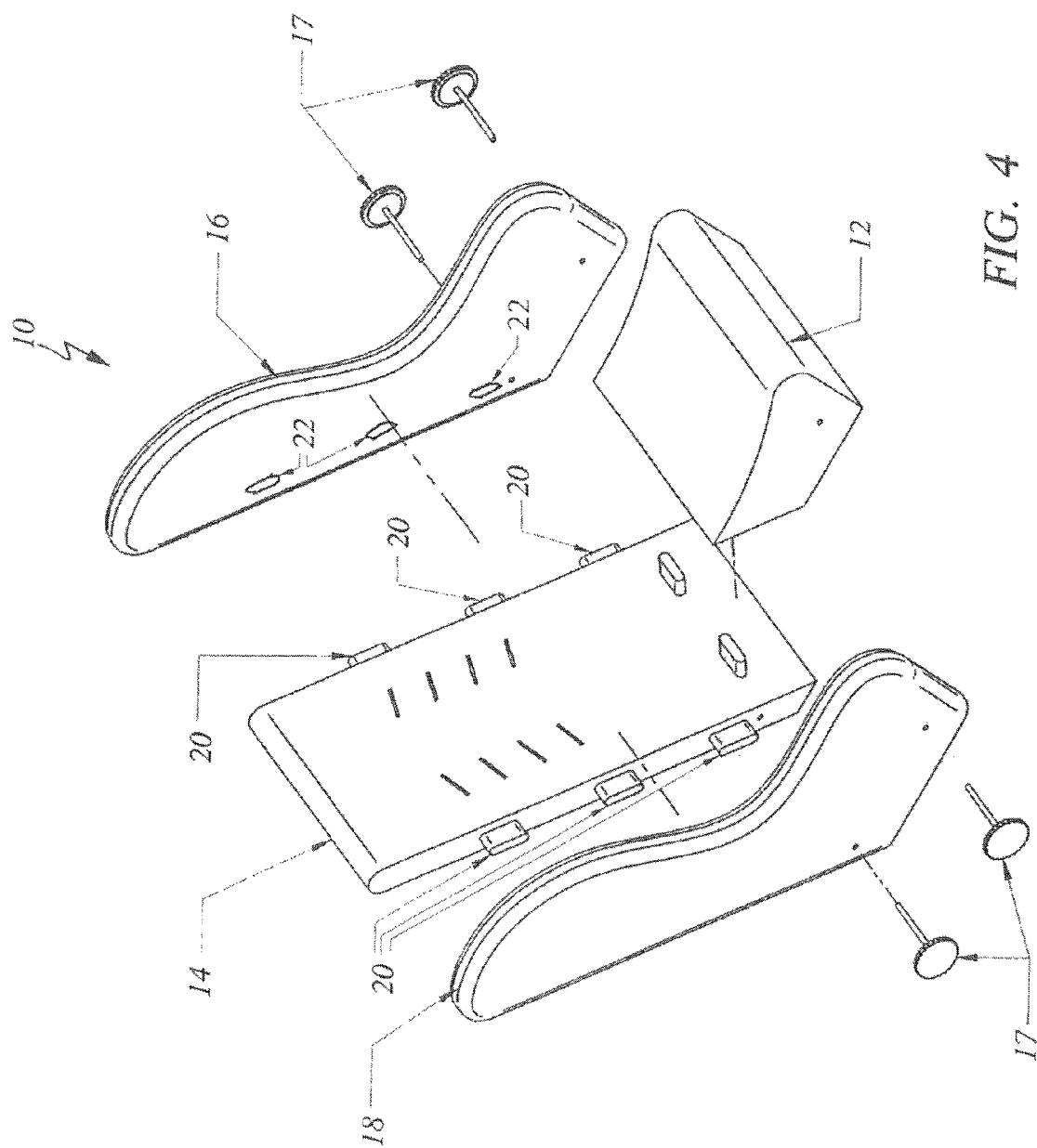
FIG. 4 is an exploded assembly view of the child car seat of FIG. 2 depicting its individual components.

In a first embodiment, shown in an isometric view in FIG. 2, in frontal and side views respectively in FIGS. 3A and 3B, and in an exploded view in FIG. 4, the subframe comprises four main sections of child car seat 10: a) a seat section 12; b) a back panel section 14; and c) side panels 16, 18. Alternative embodiments may be realized, in which the subframe may comprise a different number of sections provided the individual sections are of a size and shape capable of easy insertion in a conventional, residential-sized dishwasher.

During normal use, the car seat sections are fastened together so as to form a rigid subframe over which a padded cover may be attached by conventional means. For cleaning, the padded cover is removed and the subframe is easily disassembled. The component sections may then be conveniently placed in a dishwasher.

The preferred method of fastening the sections together requires no tools or special skill, and should be capable of assembly and disassembly by hand. The fastening method further provides rigidity and structural integrity comparable to conventional unitary subframes, and importantly, will not separate in the event of a vehicle collision.

In the first embodiment, an example of which is shown in FIGS. 2-4, side panels 16, 18 are fastened to seat 12 and back panel 14 by fasteners 17, such as large coarse threaded screws with a handwheel or knob style head. The screw portion of fasteners 17 may be metallic with either plastic or metal heads, or may be of a hard plastic construction with either plastic or metal heads. If the screw and head portions of fasteners 17 are of the same material, then each screw and head may be an integrally formed, unitary part. Other suitable non-screw type fasteners may be used with the requirement that the fasteners be capable of hand tightening and loosening. Similarly, other fastener materials may be utilized provided that the materials are capable of withstanding the anticipated forces expected on a car seat during vehicle collisions.

To prevent fasteners 17 from loosening during use, each fastener 17 may incorporate a ratchet mechanism (not shown) that prevents reverse rotation of the screws. The ratchet mechanism may be incorporated in the screw heads, and may include one or more ratchet teeth that mate with one or more corresponding teeth located at each aperture on panels 16, 18 where the screw is retained. The ratchet mechanism may be configured to release when the user presses on the screw head, pulls on it, squeezes it, or by means of any suitable action by the user. Alternatively, simple detent means or locking washers (not shown) that engage when the screws are tightened may also be used.

As shown in FIG. 4, registration tabs 20 may be incorporated to secure back panel 14 to side panels 16, 18. Registration tabs 20 are shown located at the edges of back panel 14 where it abuts side panels 16, 18, as well as where it abuts the back side of seat 12. Registration tabs 20 are preferably integrally formed on back panel 14, and are made to mate with corresponding slots 22 in side panels 16, 18, and on the back side of seat 12. Registration tabs 20 assist in forming a stable rigid construction. Alternatively, the tabs may be located on side panels 16, 18, and the slots correspondingly located in back panel 14 and the seat 12, or any interchangeable combination of slots and tabs on one section, and the corresponding tab or slot on an adjacent section.

Registration tabs 20 are preferably molded into, or may otherwise be a unitary part of, their respective car seat sections, or they may be separate parts of any suitable material, attached to their respective panels during manufacture by any suitable method, such as fastening, pressing, bonding, thermal or ultrasonic welding, or the like. Registration tabs may also be of any suitable shape: square, rectangular, triangular, round, or the like.

The registration tab/slot pairs are preferably large enough and spaced selectively to prevent inserting fasteners 17 if the panels are misaligned, thus preventing incorrect assembly. The side panel slots may be blind, or the side panel tab/slot pairs may be set in different or offset patterns on the left and right sides of the subframe, forming a mechanical keyed attachment to prevent assembling the side panels in the wrong locations.

FIG. 5 depicts a second embodiment of the present invention. Child car seat 30 is depicted in an assembly configuration, having back panel 32, side panels 34, 36, and seat 38. As illustrated, side panels 34, 36 may be further segmented into sections 35a, 35b, and 37a, 37b, respectively. This segmentation allows each side panel to be a shorter length to facilitate placement in a residential-sized dishwasher without compromising the structural integrity of the assembled car seat. In this example, at each interfacing joint is at least one elongated registration tab 40a-40f. Registration tab 40a is located on the side of back panel 32, and interfaces with slot 42a located on side panel section 35a, and with slot 42b located on the lower side panel section 35b. Similarly, on the opposite side of side panel 32, a second registration tab 40b interfaces with slot 44a located on side panel section 37a, and with slot 44b located on the lower side panel section 37b.

Each side panel's sections 35a, 35b and 37a, 37b, respectively, are attached to one another by tab and slot connections. Registration tab 40c, located on the bottom of side panel section 35a, mates with slot 46a located on the top of side panel section 35b. A similar connection is performed on the side panel sections located on the opposite side of child car seat 30, where registration tab 40d, located on side panel section 37a, is shown mated with a slot (not shown) located on the top of side panel section 37b.

Registration tab 40e is located on the lower portion on one side of seat 38, and formed to mate with slot 42c. Similarly, registration tab 40f is located on the lower portion of the opposite side of seat 38, and formed to mate with a slot (not shown) on side panel 37b.

The bottom of back panel 32 may include a mortise tab 40g, which is formed to mate with a corresponding mortise slot (not shown) on the top back portion of seat 38. Seat 38 is assembled to the subframe by sliding it into the slots in each side panel lower section, as illustratively shown in FIG. 5. If used, mortise tab 40g provides additional structural rigidity and integrity, and prevents seat 38 from sliding forward or rearward when in use.

The registration tabs and slots of the preferred embodiments may be formed integrally with their respective sections, and are preferably in the shape of a dovetail joint for greater structural integrity to withstand separation forces.

The complete subframe is assembled by first assembling upper and lower side panels 34, 36. Seat 38 is then inserted into side panels 34, 36, and back panel 32 is inserted into side panels 34, 36. If mortise tab 40g is used, it is interlocked into a slot within the top back section of seat 38 when back panel 32 is slidably attached to side panels 34, 36. Back panel 32 may be inserted and lowered into place with the use of handle 50. Back panel 32 may then be locked into place by a separate latch mechanism after having been mated with side panels 34, 36.

Figure 6B:
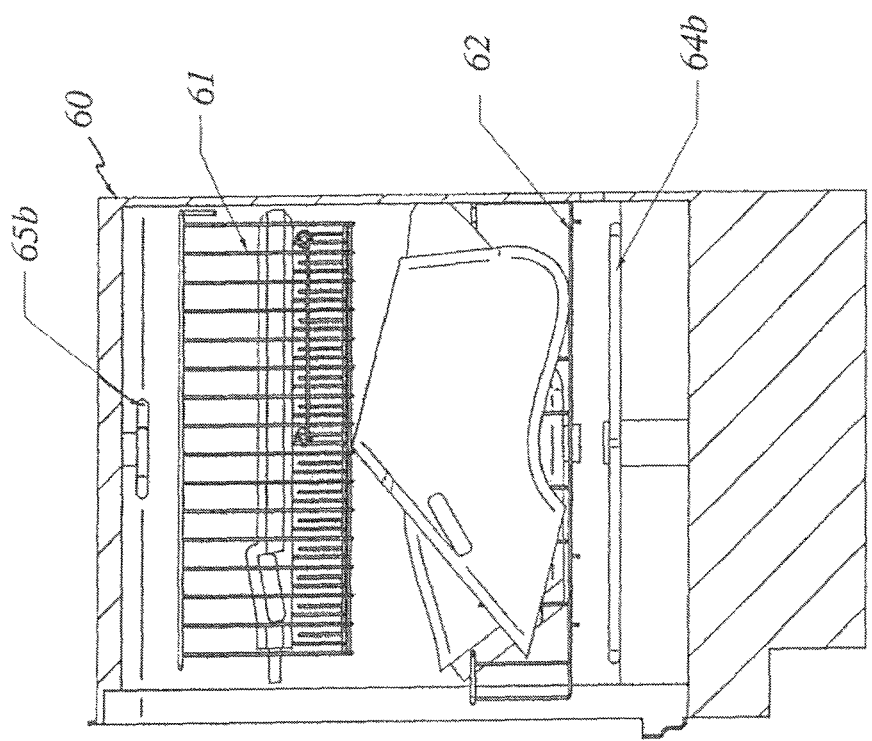
FIG. 6B illustrates the placement of sections of the child car seat of the present invention into the residential-sized dishwasher of FIG. 6A.
Figure 6A:
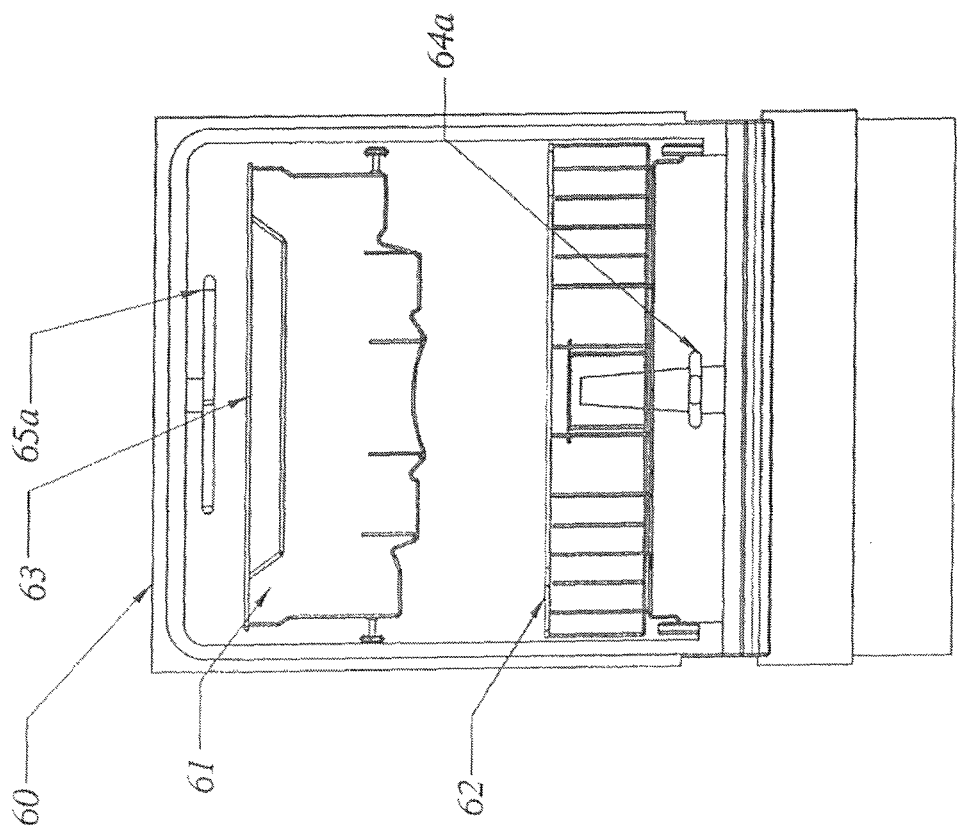
FIG. 6A depicts a typical residential-sized dishwasher for washing the disassembled sections of the child car seat of the present invention.

Typical residential-sized dishwashers, examples of which are shown in FIGS. 6A and 6B, comprise a housing 60, enclosing a wash chamber 61. Typically, wash chamber 61 contains a lower rack 62 and an upper rack 63. Wash water is disbursed in the dishwasher at suitable velocity by rotating lower spray bar 64a, 64b and an upper spray bar 65a, 65b. The clearance between the lower and upper racks generally limits the size of items that will conveniently fit in the wash chamber. FIG. 6B illustrates the possible placement of the sections of car seat 30 into a residential dishwasher. Importantly, the sections fit on the upper and lower racks of a dishwasher in a manner that allows easy placement and removal, and further allows space for the upper and lower spray bars to operate, and the dishwasher door to close.

As noted in the second embodiment of the present invention, the individual sections are attached by sliding joints or hinged joints at their respective edges. Generally, this mating scheme is stronger than using fasteners, and advantageously eliminates the need for screws or other fasteners that the end user must handle, and could ultimately be misplaced. When each section is fully inserted into its respective mating section, a rigid joint is formed, and the two sections effectively become a rigid, unitary structure.

Figure 7:
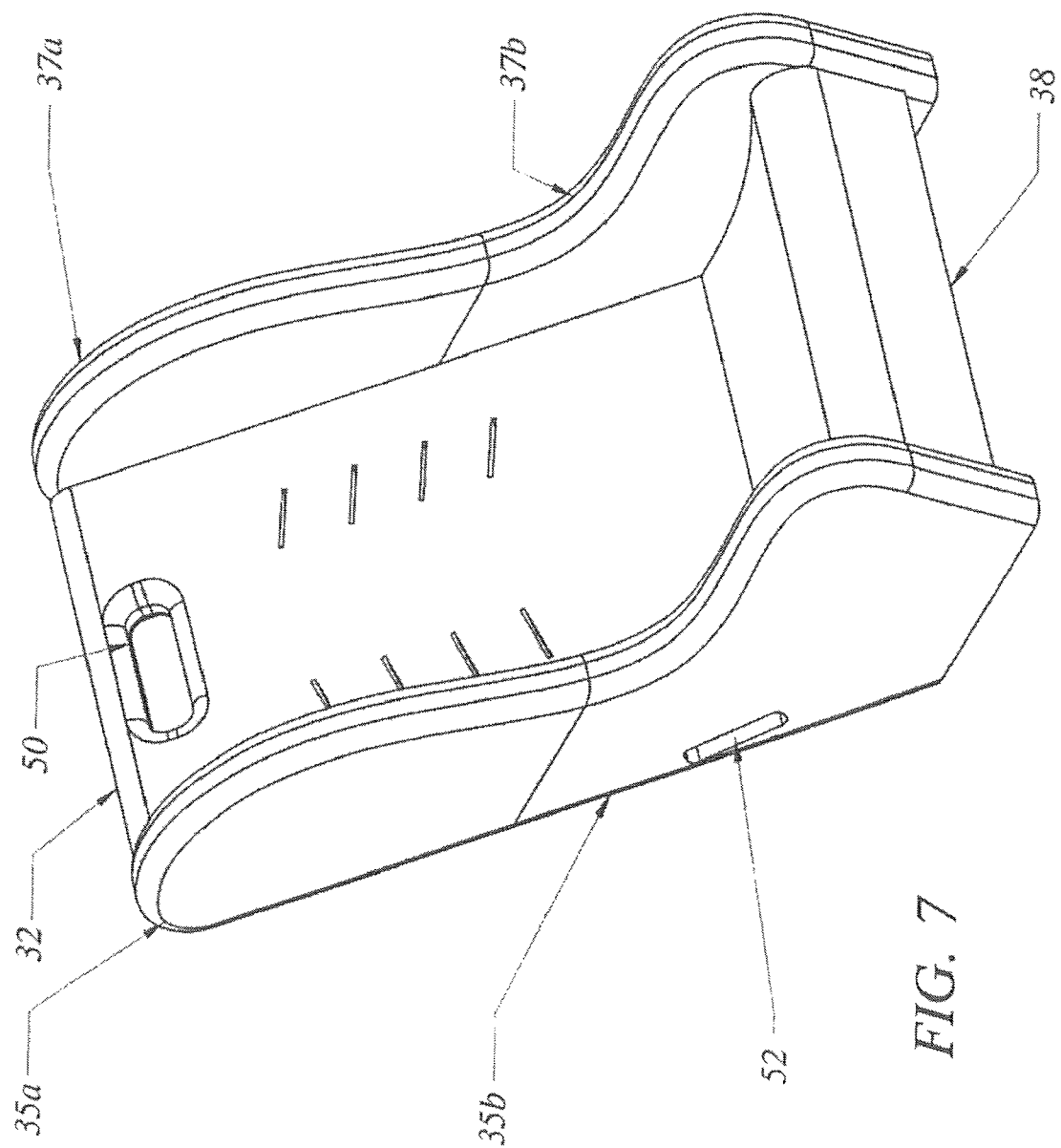
FIG. 7 depicts a perspective view of the completed assembly of the child car seat of FIG. 5.

The completed assembly of the car seat 30 of FIG. 5 is shown in FIG. 7. When fully inserted, the back panel prevents the side panels from flexing at their section joints, adding structural rigidity and strength to the side panels.

When the unit is fully assembled, with the exception of upward motion of the back panel, all degrees of freedom at the joints are restricted. This prevents the sections from loosening or shifting during use, maintaining tight secure assembly, and sustained structural rigidity and integrity.

Handle 50 may be formed in back panel 32 to assist with removing back panel 32 during disassembly, and may also conveniently be used for carrying the unit (without child) to and from the vehicle.

When in normal use inside the vehicle, upward motion of the back panel is prevented by the vehicle seat belt, and may be further restricted by a suitable detent, or latch (not shown) at one or more joints. The fully assembled subframe presents structural rigidity and integrity commensurate with conventional child seat subframes, and is capable of withstanding the forces associated with vehicular collisions.

Alternatively, a plurality of ribs or tabs and corresponding slots may be employed instead of a single rib and slot pair at any joint. The rib and slot pair or pairs for any joint may be at any suitable angle to the joint centerline, and preferably are parallel or normal to the joint centerline.

The gender of the sliding joints may be reversed, i.e., the back panel and/or the seat may have slots, and the side panels may have corresponding ribs. Detents or other forms of latches may be incorporated to keep the sliding joints fully engaged during use.

The ribs or tabs may molded into, or integral with, their respective sections, or they may be separate parts of any suitable material, attached to their respective sections during manufacture by any suitable method, such as fastener attachment, a pressing or bonding attachment, ultrasonic welding, or the like.

Figure 8:
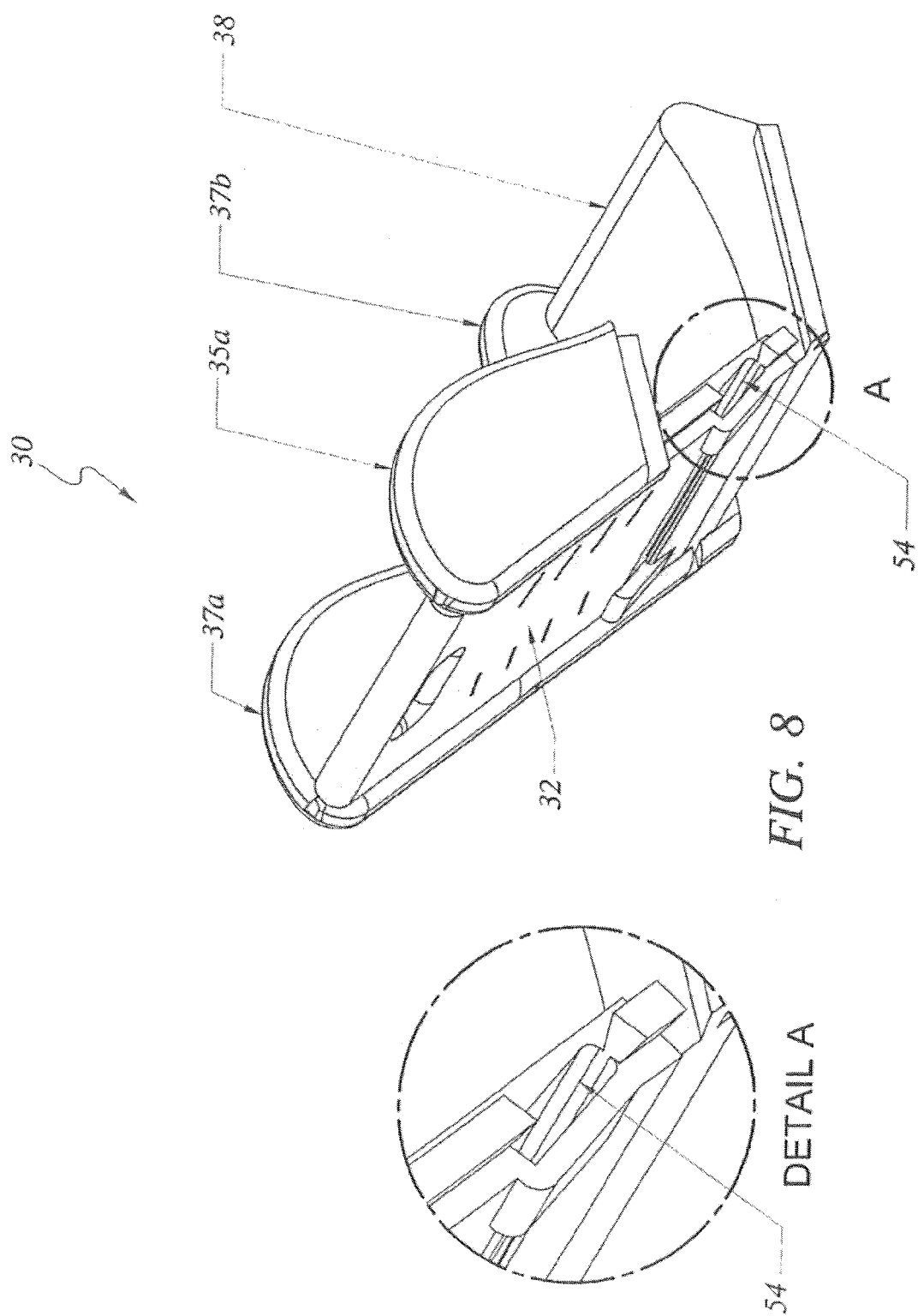
FIG. 8 depicts an isometric view of the child car seat of FIG. 5 with a portion of the lower side panel removed to expose slots for the vehicle seat belt in the back panel.

Slots 52, shown in FIGS. 5 and 7, may be provided in side panels 34, 36, preferably side panels 35b, 37b, for the vehicle seat belt, such that the vehicle seat belt secures the unit firmly to the vehicle seat. In one embodiment, these slots preferably align with slots 54 in back panel 32, as shown in FIG. 8, when back panel 32 is fully inserted into side panels 34, 36. Child seat 30 is then secured to the vehicle seat by inserting the vehicle seat belt (not shown) first through slot 52 then through slot 54 on one side of the unit, passing the belt behind back panel 32, and through slot 54 and then through slot 52 on the opposite side of the unit. At any joint, a plurality of tabs, or a single large tab as shown by example in FIG. 5, may be used.

The vehicle seat belt thus secures the back panel and both side panels firmly to the vehicle seat, and additionally prevents upward motion of the back panel. If the unit is not properly assembled, slots 52 will not align with their corresponding slots 54, preventing the vehicle seat belt from being properly inserted, and thus preventing a misassembled unit from being used.

Figure 10:
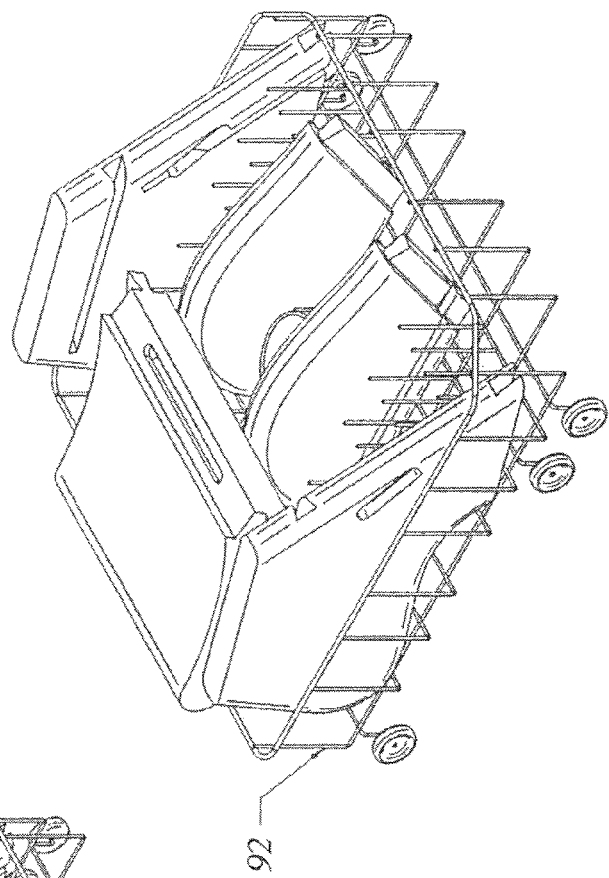
FIG. 10 is a view of the lower rack of dishwasher of FIG. 9 with the upper rack removed for clarity giving a perspective view of the components of the child car seat of the present invention placed therein.
Figure 9:
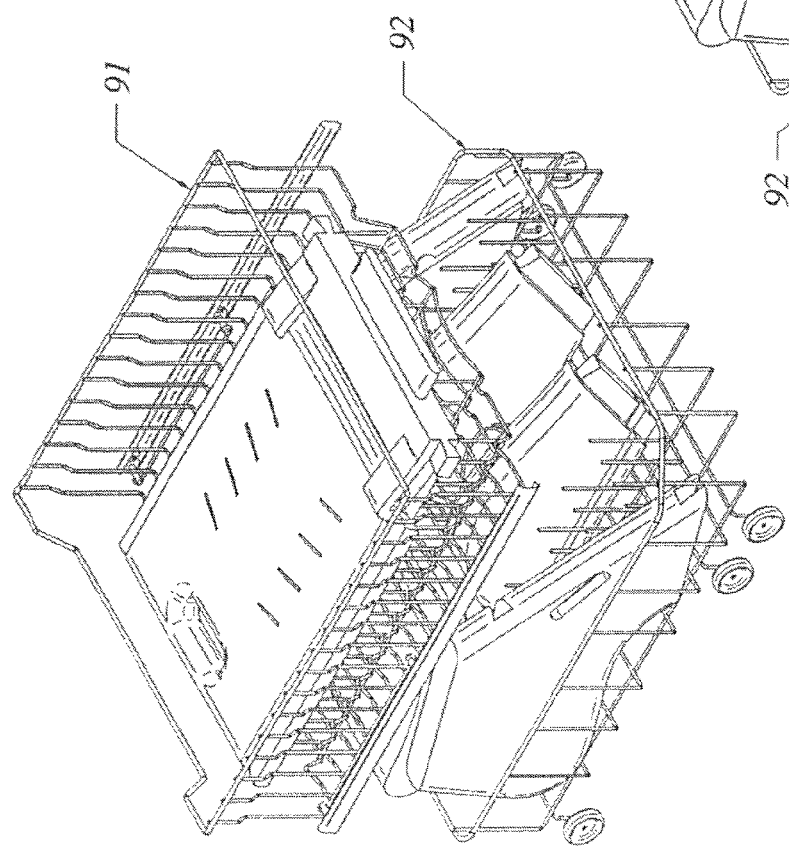
FIG. 9 is a perspective view of the components of the child car seat of the present invention placed in dishwasher racks with the dishwasher housing removed for clarity.

When the unit is disassembled, the individual panels and sections may conveniently be placed in a residential-sized dishwasher for cleaning, as shown in FIGS. 6, 9 and 10. A residential-sized dishwasher is generally no larger than twelve cubic feet, with typical dimensions on the order of 2'×2'×3'. FIG. 6B shows a cross-sectional view of a dishwasher with all child seat components except the back panel in the lower rack, and the back panel in the upper rack. FIG. 9 is a perspective view of the components of the child car seat of the present invention placed in dishwasher racks 91, 92 with the dishwasher housing removed for clarity. FIG. 10 is a view of lower rack 91 of the dishwasher of FIG. 9 with the upper rack removed for clarity.

Some dishwashers employ racks with very tall tines, and/or additional substructures for securing cups and small items. These features typically increase the rack height, and some dishwashers may have insufficient clearance above the bottom rack for the disassembled subframe.

Figure 12B:
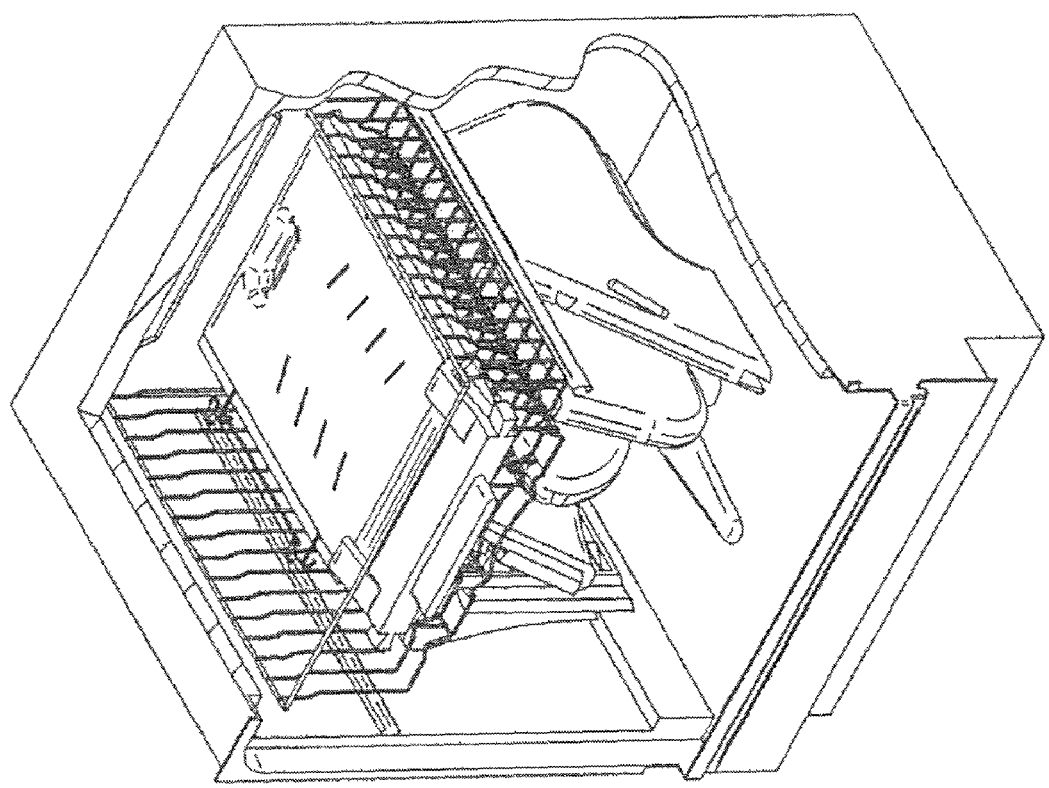
FIG. 12B depicts an isometric view of the dishwasher of FIG. 12A.
Figure 12A:
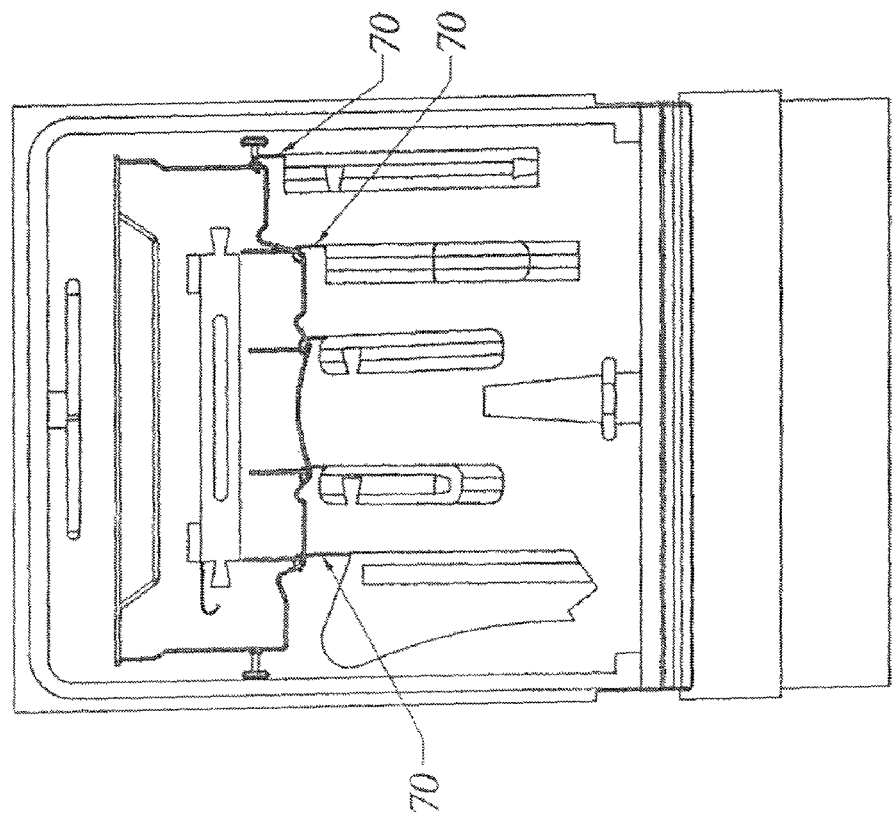
FIG. 12A depicts a front view of the components of the child car seat hanging in a residential-sized dishwasher with the dishwasher lower rack removed.

To accommodate such residential-sized dishwashers and to make loading the subframe into most dishwashers easier, as shown in FIGS. 11A and 11B, a hook 70 or other suitable hanging device may be attached at a suitable location on each panel section, so that the sections may hang from the dishwasher upper rack. The lower rack, which easily lifts out of most dishwashers, may be then removed completely, providing increased clearance and more convenient placement of the subframe panels in the dishwasher, as shown in FIGS. 12A and 12B. Hooks 70 or other hanging devices may be integral with their respective panel sections, or may be separate and comprised of any suitable material. Hooks 70 may be configured to be removable or retractable, or may fold flat when not in use.

The panels and sections of the child car seat of the present invention may lie flat in the dishwasher, but are preferably placed on edge, advantageously allowing enhanced exposure to wash water. All of the panels or sections in the above described embodiment will fit conveniently in an edgewise manner, except in some cases for back panel 32, which, if formed as one piece, may be too tall to fit edgewise, or for some models, simply too large to fit in the residential-sized dishwasher.

Figure 14B:
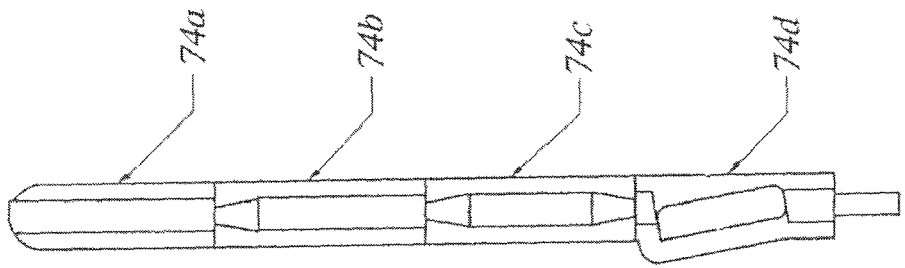
FIG. 14B depicts an edge view of the assembled sections of the back panel of FIG. 13.
Figure 14A:
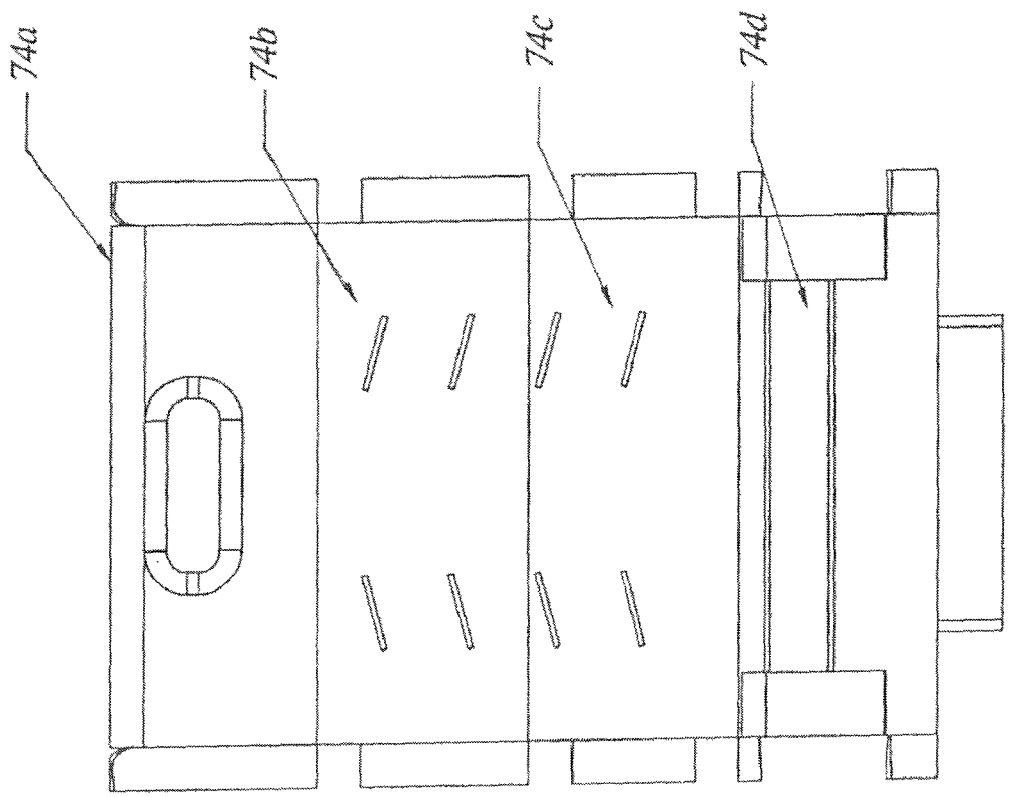
FIG. 14A depicts a side view of the assembled sections of the back panel of FIG. 13.
Figure 15B:
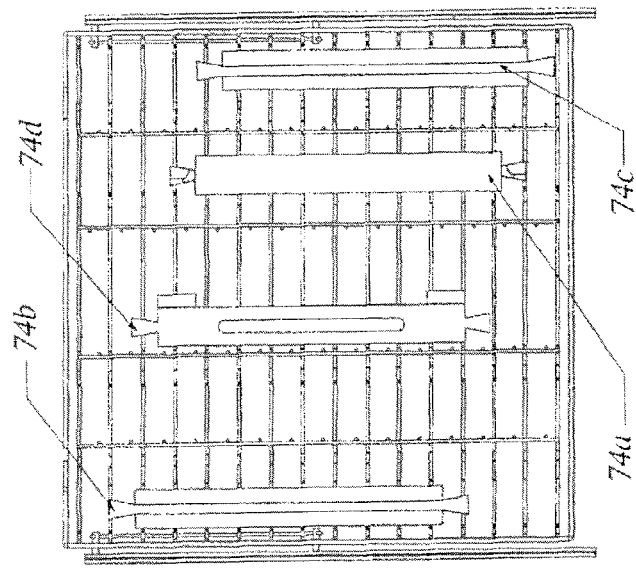
FIG. 15B depicts a top view of the sections of the back panel of FIG. 13 in a residential-sized dishwasher rack.
Figure 15A:
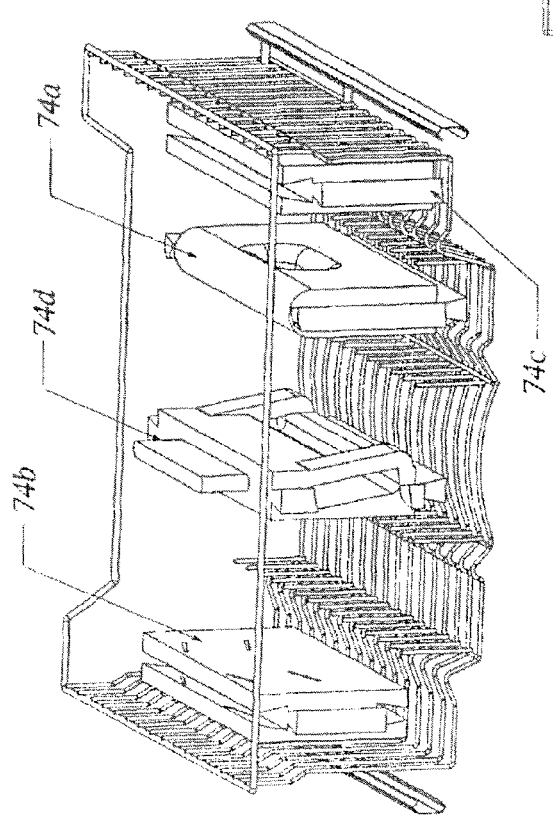
FIG. 15A depicts an isometric view of the sections of the back panel of FIG. 13 in a residential-sized dishwasher rack.

To address this, a separate back panel embodiment 72 comprises a sufficient quantity of sections small enough to fit edgewise in a residential dishwasher. An example of this embodiment is shown in FIG. 13, in which back panel 72 is shown comprised of four sections 74a-74d, although any number of multiple sections may be considered. These sections are assembled together into a unitary back panel using tabs and slots, such as dovetail joints 76, similar to the dovetail joints depicted in FIG. 5. FIGS. 14A and 14B depict a side view and an edge view of the assembled sections of back panel 72. When disassembled, sections 74a-74d will conveniently fit edgewise in a residential dishwasher as shown in FIGS. 15A and 15B.

Similarly, any panel, such as the back panel, side panels, or the seat, may comprise a two or more sections that are joined by sliding joints or other suitable joints, providing improved water circulation and more convenient loading of each section into the dishwasher.

If small enough, adjacent panels may comprise a single folding panel, joined by suitable hinge. However, a large, foldable section will not lend itself for a dishwasher application, insomuch as many portions of the large, foldable section will not be exposed to the wash water.

Any panel or section may comprise a plurality of smaller sections that are permanently fastened together in manufacture by any suitable method, such as fasteners, pressing, bonding, ultrasonic welding, or the like. The components may be produced by any suitable method or combination thereof, such as molding, casting, machining, stamping, or the like.

For simplicity, the examples herein show all panels except the seat as being flat. Any panel or section may be flat as shown, or may be curved or deeply contoured as desired, for example to provide enhanced fit and comfort for the child.

To provide supplemental protection for the child, one or more panels or sections may be filled with styrene foam or other energy absorbing material, or energy absorbing material may be attached to the surface of one or more panels or sections by any suitable method.

The panels and/or sections shown herein are preferably of the hollow molded type, commonly used in children's toys and furniture. Alternatively, the panels may be hollow or solid of any suitable material, and any suitable molding, fabrication, or manufacturing technique may be used in manufacture.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A child restraint seat subframe adapted to be removably attached to a vehicle seat, said child restraint seat subframe comprising:

left and right side panels, each side panel having a top surface and comprising at least two sections, including an upper section and a lower section, a front edge, and a back edge, each of said at least two sections sized to fit in a residential-sized dishwasher;

a back panel having a top surface, a bottom surface, a front surface, and left and right edge surfaces; and a seat sized to fit in a residential-sized dishwasher, said seat having a top surface, and left and right side faces, said seat left side face in contact with a portion of said left side panel, said seat right side face in contact with a portion of said right side panel; and wherein said left side panel sections are slidably mated to each other and to the back panel;

said right side panel sections are slidably mated to each other and to the back panel;

said back panel left edge surface is slidably mated to said left side panel, such that said back panel top surface is secured at approximately the same height as said left side panel top surface;

said back panel right edge surface is slidably mated to said right side panel, such that said back panel top surface is secured at approximately the same height as said right side panel top surface;

said seat left side face is slidably mated to said left side panel from the back edge of said left side panel; and said seat right side face is slidably mated to said right side panel from the back edge of said right side panel;

wherein each surface is secured to the adjacent surface and is capable of withstanding the anticipated forces expected on a car seat during vehicle collisions.

2. The child restraint seat subframe of claim 1 further including:
   said left side panel upper section slidably mated to said left side panel lower section;
   said right side panel upper section slidably mated to said right side panel lower section;
   said back panel left edge surface slidably mated to said left side panel upper section;
   said back panel right edge surface slidably mated to said right side panel upper section;
   said seat left side face slidably mated to said left side panel lower section; and
   said seat right side face slidably mated to said right side panel lower section.

3. The child restraint seat subframe of claim 2 further including having said back panel left edge surface slidably mated to said left side panel lower section, and said back panel right edge surface slidably mated to said right side panel lower section.

4. The child restraint seat subframe of claim 1 wherein at least one interlocking tongue and groove joint is located at each mating interface.

5. The child restraint seat subframe of claim 4 wherein said at least one interlocking tongue and groove joint includes a dovetail joint.

6. The child restraint seat subframe of claim 1 wherein said seat top surface and said back panel bottom surface are mated by at least one mortise tab and slot combination.

7. The child restraint seat subframe of claim 1 including slots located in said left and right side panel lower sections approximately at said back edges for insertion of a vehicle seat belt.

8. The child restraint seat subframe of claim 7 including slots located in said back panel left and right edge surfaces corresponding to said slots located in said left and right side panel lower sections, respectively, for insertion of said vehicle seat belt.

9. The child restraint seat subframe of claim 1 including having said back panel comprise a plurality of panel segments, each of said panel segments having a mating bottom edge, or a mating top edge, or both, for mating to an adjacent panel segment.

10. The child restraint seat subframe of claim 9 wherein said plurality of back panel segments includes at least one interlocking tongue or groove joint located at each mating interface.

11. The child restraint seat subframe of claim 10 wherein said at least one interlocking tongue or groove joint includes a dovetail joint formation.

12. The child restraint seat subframe of claim 9 including at least one hanging device attached to, or integrally formed with, each of said plurality of panel segments for hanging back panel segments in said residential-sized dishwasher.

13. The child restraint seat subframe of claim 1 including having at least one hanging device attached to, or integrally formed with, each of said left and right side panel sections for hanging said panel sections in said residential-sized dishwasher.

14. The child restraint seat subframe of claim 13 wherein said at least one hanging device includes a hook.

15. The child restraint seat subframe of claim 1 including having at least one hanging device attached to, or integrally formed with, said back panel for hanging said back panel in said residential-sized dishwasher.

16. The child restraint seat of claim 1 including having at least one hanging device attached to, or integrally formed with, said seat for hanging said seat in said residential-sized dishwasher.

17. A method of cleaning a child restraint seat subframe comprising:
   disassembling said child restraint seat into its component sections, including:
   slidably removing a back panel from left and right side panels and from a seat by pulling said back panel upwards relative to said side panels and said seat portion, through a tongue and groove joint connecting said back panel to said left and right side panels;
   slidably removing a first section of said left side panel from a second section of said left side panel by pulling said left side panel first section away from said left side panel second section in a direction parallel to a tongue and groove joint connecting both sections;
   slidably removing a first section of said right side panel from a second section of said right side panel by pulling said right side panel first section away from said right side panel second section in a direction parallel to a tongue and groove joint connecting both sections;
   slidably removing said seat from said left and right side panel by pulling said seat in a direction parallel to a tongue and groove joint connecting said left and right panels and said seat, and in a direction opposite said subframe front end;
   placing said left and right side panels, said back panel, and said seat, together within a residential-sized dishwasher; and
   washing said left and right side panels, said back panel, and said seat, simultaneously or separately within said residential-sized dishwasher.

18. The method of claim 17 further including separating individual back panel sections, which comprise said back panel, from one another by pulling each of said back panel sections in opposite directions, parallel to a tongue and groove joint connecting one back panel section to an adjacent back panel section.

19. The method of claim 17 including hanging said component sections by individual hanging devices formed integrally with, or attached to, said component sections, onto racks in said residential-sized dishwasher.

* * * * *